(12) United States Patent
Noda (10) Patent No.: US 11,378,170 B2
(45) Date of Patent: Jul. 5, 2022

(54) GEAR DEVICE AND ROBOT

(71) Applicant: SEIKO EPSON CORPORATION, Tokyo (JP)

(72) Inventor: Yoichi Noda, Suwa-gun Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 72 days.

(21) Appl. No.: 17/105,618

(22) Filed: Nov. 26, 2020

(65) Prior Publication Data

US 2021/0164555 A1 Jun. 3, 2021

(30) Foreign Application Priority Data

Nov. 29, 2019 (JP) .............................. JP2019-216050

(51) Int. Cl.
| | |
|---|---|
| *F16H 1/32* | (2006.01) |
| *F16H 49/00* | (2006.01) |
| *B25J 9/10* | (2006.01) |
| *F16C 33/58* | (2006.01) |
| *F16C 19/06* | (2006.01) |

(52) U.S. Cl.
CPC ............ *F16H 49/001* (2013.01); *B25J 9/102* (2013.01); *B25J 9/1025* (2013.01); *F16C 19/06* (2013.01); *F16C 33/585* (2013.01); *F16C 2361/00* (2013.01)

(58) Field of Classification Search
CPC .......... F16H 1/32; F16H 49/001; B25J 9/1025
See application file for complete search history.

(56) References Cited

U.S. PATENT DOCUMENTS

| | | | | |
|---|---|---|---|---|
| 2,931,249 A | * | 4/1960 | Musser ................. | F16H 49/001 74/640 |
| 3,471,913 A | * | 10/1969 | Scott ..................... | F16H 49/001 29/434 |
| 8,020,470 B2 | * | 9/2011 | Saito ..................... | F16H 49/001 74/640 |
| 2018/0283518 A1 | * | 10/2018 | Kataoka ................ | B25J 9/1025 |

FOREIGN PATENT DOCUMENTS

| | | | |
|---|---|---|---|
| CN | 110388439 | * | 10/2019 |
| JP | 2007/137882 | * | 6/2007 |
| JP | 2015209931 A | | 11/2015 |

* cited by examiner

*Primary Examiner* — William C Joyce
(74) *Attorney, Agent, or Firm* — Gang Yu (57) ABSTRACT

A gear device includes an internal gear, a flexible external gear, and a wave generator. The wave generator has an elliptic cam and a bearing. An inner ring has an inner ring raceway surface which a plurality of balls are in contact with, and a pair of inner ring shoulder parts. At a position of a minor axis, a first inner ring shoulder part has a greater height than a second inner ring shoulder part. At a position of a major axis, the second inner ring shoulder part has a greater height than the first inner ring shoulder part.

7 Claims, 8 Drawing Sheets

GEAR DEVICE AND ROBOT

The present application is based on, and claims priority from JP Application Serial Number 2019-216050, filed Nov. 29, 2019, the disclosure of which is hereby incorporated by reference herein in its entirety.

BACKGROUND

1. Technical Field

The present disclosure relates to a gear device and a robot having a gear device.

2. Related Art

Generally, in a robot, a speed reducer is provided at a drive shaft of a motor in order to drive a joint part of a robot arm. As such a speed reducer, for example, a gear device described in JP-A-2015-209931 is known.

This gear device has an annular internal gear, a flexible external gear partly meshing with the internal gear, and a wave generator being in contact with an inner circumferential surface of the external gear and moving the meshing position between the internal gear and the external gear in a circumferential direction about the rotation axis. The wave generator has a cam having an elliptic outer circumferential surface having a major axis and a minor axis, and a bearing arranged between the inner circumferential surface of the external gear and the outer circumferential surface of the cam. The bearing is a deep groove ball bearing having a plurality of balls held between an inner ring and an outer ring. A groove serving as a raceway surface for the balls is formed on each of the inner ring and the outer ring.

It is described that, in such a gear device, when the elliptic wave generator is fitted into the external gear, a deformation called coning occurs in the external gear. Coning is a deformation in which the opening of the external gear opens outward near the major axis whereas the opening of the external gear is narrowed inward near the minor axis. JP-A-2015-209931 discloses that the gap between the inner circumferential surface of a cylindrical part of the external gear and the outer circumferential surface of the outer ring of the bearing is reduced in order to solve the problem of a drop in torsional stiffness of an output shaft coupled to the external gear due to coning.

However, the applicant of the present disclosure has found that another problem due to coning is that the ball hitting the edge of the raceway surface in the bearing at the positions of the major axis and the minor axis may cause deterioration of or damage to the raceway surface and the ball.

SUMMARY

According to a first aspect of the present disclosure, a gear device is provided. This gear device includes: an internal gear; a flexible external gear partly meshing with the internal gear and rotating relative to the internal gear about a rotation axis; and a wave generator being in contact with an inner circumferential surface of the external gear and moving a meshing position between the internal gear and the external gear in a circumferential direction about the rotation axis. The wave generator has a cam having an elliptic outer circumferential surface having a major axis and a minor axis, and a bearing arranged between the inner circumferential surface of the external gear and the outer circumferential surface of the cam. The bearing has an inner ring, an outer ring, and a plurality of balls arranged between the inner ring and the outer ring. The inner ring has an inner ring raceway surface which the plurality of balls are in contact with, and a pair of inner ring shoulder parts adjacent to the inner ring raceway surface and protruding toward the outer ring as viewed in a cross section including the rotation axis. The external gear has a first end part opening in a direction along the rotation axis, and a second end part opposite to the first end part. The wave generator is fitted in the inner circumferential surface of the external gear at a position closer to the first end part than to the second end part of the external gear. The pair of inner ring shoulder parts include a first inner ring shoulder part closer to the first end part than to the second end part, and a second inner ring shoulder part closer to the second end part than to the first end part. At a position of the minor axis, the first inner ring shoulder part has a greater height than the second inner ring shoulder part. At a position of the major axis, the second inner ring shoulder part has a greater height than the first inner ring shoulder part.

According to a second aspect of the present disclosure, a robot is provided. This robot includes: a first member forming a base or an arm; a second member forming an arm provided in such a way as to be able to swivel in relation to the first member; and a gear device transmitting a drive force from one of the first member and the second member toward the other. The gear device has an internal gear, a flexible external gear partly meshing with the internal gear and rotating relative to the internal gear about a rotation axis, and a wave generator being in contact with an inner circumferential surface of the external gear and moving a meshing position between the internal gear and the external gear in a circumferential direction about the rotation axis. The wave generator has a cam having an elliptic outer circumferential surface having a major axis and a minor axis, and a bearing arranged between the inner circumferential surface of the external gear and the outer circumferential surface of the cam. The bearing has an inner ring, an outer ring, and a plurality of balls arranged between the inner ring and the outer ring. The inner ring has an inner ring raceway surface which the plurality of balls are in contact with, and a pair of inner ring shoulder parts adjacent to the inner ring raceway surface and protruding toward the outer ring as viewed in a cross section including the rotation axis. The external gear has a first end part opening in a direction along the rotation axis, and a second end part opposite to the first end part. The wave generator is fitted in the inner circumferential surface of the external gear at a position closer to the first end part than to the second end part of the external gear. The pair of inner ring shoulder parts include a first inner ring shoulder part closer to the first end part than to the second end part, and a second inner ring shoulder part closer to the second end part than to the first end part. At a position of the minor axis, the first inner ring shoulder part has a greater height than the second inner ring shoulder part. At a position of the major axis, the second inner ring shoulder part has a greater height than the first inner ring shoulder part.

DESCRIPTION OF EXEMPLARY EMBODIMENTS

Figure 1:
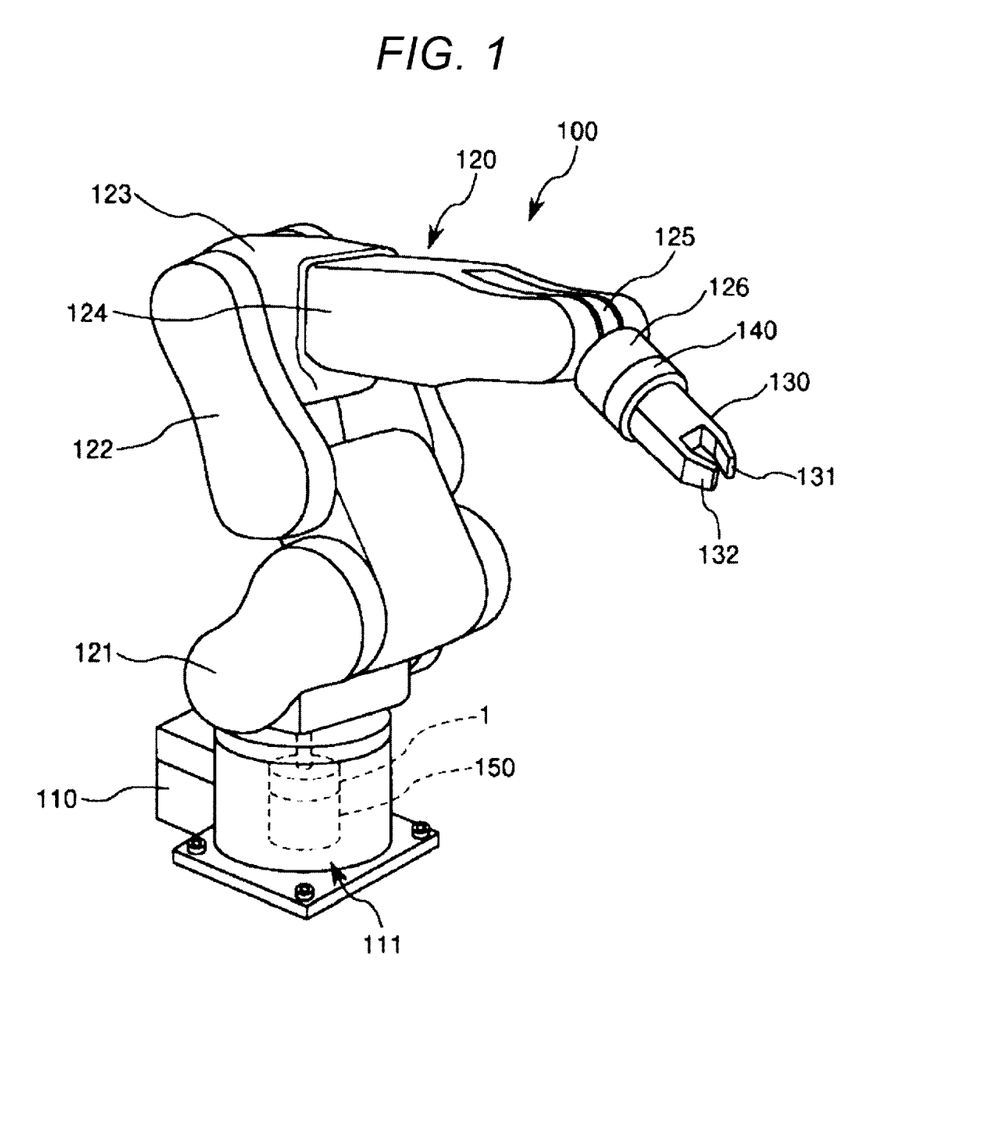
FIG. 1 shows a schematic configuration of an embodiment of a robot according to the present disclosure.

FIG. 1 shows a schematic configuration of an embodiment of the robot according to the present disclosure. A robot 100 shown in FIG. 1 is a 6-axis vertical articulated robot and can perform, for example, work such as supplying, eliminating, transporting, and assembling a precision device or a component forming a precision device.

The robot 100 has a base 111, a robot arm 120 coupled to the base 111, and a force detector 140 and a hand 130 provided at a distal end part of the robot arm 120. The robot 100 also has a control device 110 controlling a plurality of drive sources generating power to drive the robot arm 120. The drive sources include a motor 150 and a gear device 1.

The base 111 is a part to install the robot 100 at an arbitrary installation site. The installation site of the base 111 is not particularly limited and may be, for example, a floor, wall, ceiling, movable trolley or the like.

The robot arm 120 has a first arm 121, a second arm 122, a third arm 123, a fourth arm 124, a fifth arm 125, and a sixth arm 126. These arms are coupled in this order from the proximal end toward the distal end. The first arm 121 is coupled to the base 111. At a distal end of the sixth arm 126, an end effector such as the hand 130 for gripping various components or the like is removably attached. The hand 130 has two fingers 131, 132 and can grip, for example, various component or the like with the fingers 131, 132.

In the base 111, a drive source including the motor 150 such as a servo motor driving the first arm 121 and a gear device 1 as a speed reducer is provided. Although not illustrated, a plurality of drive sources having a motor and a speed reducer are provided for the arms 121 to 126, respectively. Each drive source is controlled by the control device 110.

In such a robot 100, the gear device 1 transmits a drive force from one of the base 111 as a first member and the first arm 121 as a second member toward the other. More specifically, the gear device 1 transmits a drive force causing the first arm 121 to swivel in relation to the base 111, from the base 111 toward the first arm 121. Here, since the gear device 1 functions as a speed reducer, the rotation of the drive force from the motor 150 can be decelerated so as to cause the first arm 121 to swivel in relation to the base 111.

The meaning of "swivel" includes moving in one direction or in both directions including the opposite direction about a certain center point, and rotating about a center point.

In this way, the robot 100 has the base 111 as a first member forming a base, the first arm 121 as a second member forming an arm provided in such a way as to be able to swivel in relation to the base 111, and the gear device 1 transmitting a drive force from one of the base 111 and the first arm 121 toward the other.

Of the second to sixth arms 122 to 126, an arbitrary number of arms selected in order from the first arm 121 side may be regarded as the "second member". That is, it can be said that a structure formed of the first arm 121 and the arbitrary number of arms selected in order from the first arm 121 side, of the second to sixth arms 122 to 126, is the "second member". For example, it can be said that a structure formed of the first arm 121 and the second arm 122 is the "second member" or that the entirety of the robot arm 120 is the "second member". The "second member" may also include the hand 130. That is, it can also be said that a structure formed of the robot arm 120 and the hand 130 is the "second member".

The robot 100 as described above has the gear device 1 described below. Hereinafter, the gear device 1 as an example of the gear device according to the present disclosure will be described.

Figure 2:
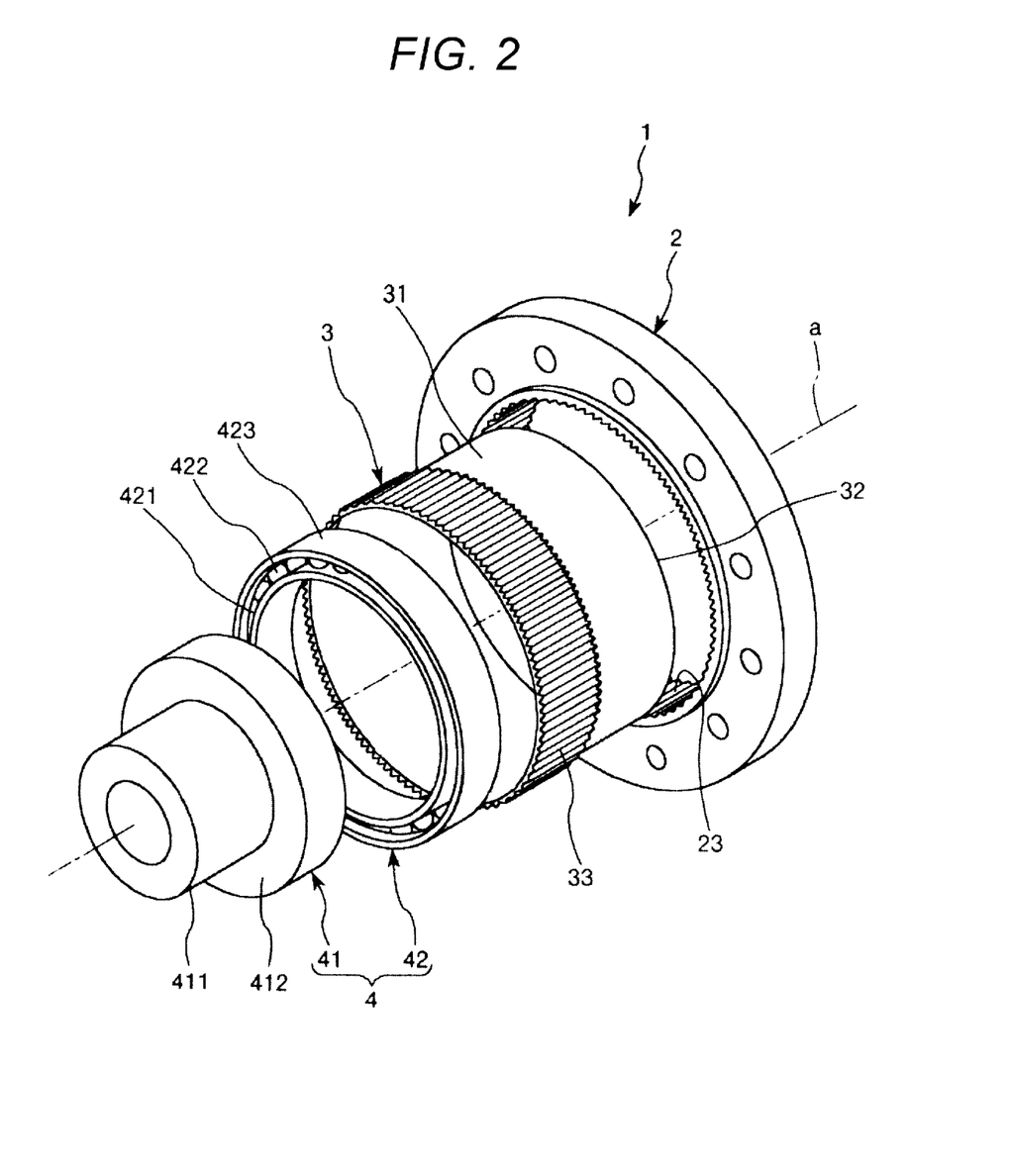
FIG. 2 is an exploded perspective view showing a gear device according to an embodiment of the present disclosure.
Figure 3:
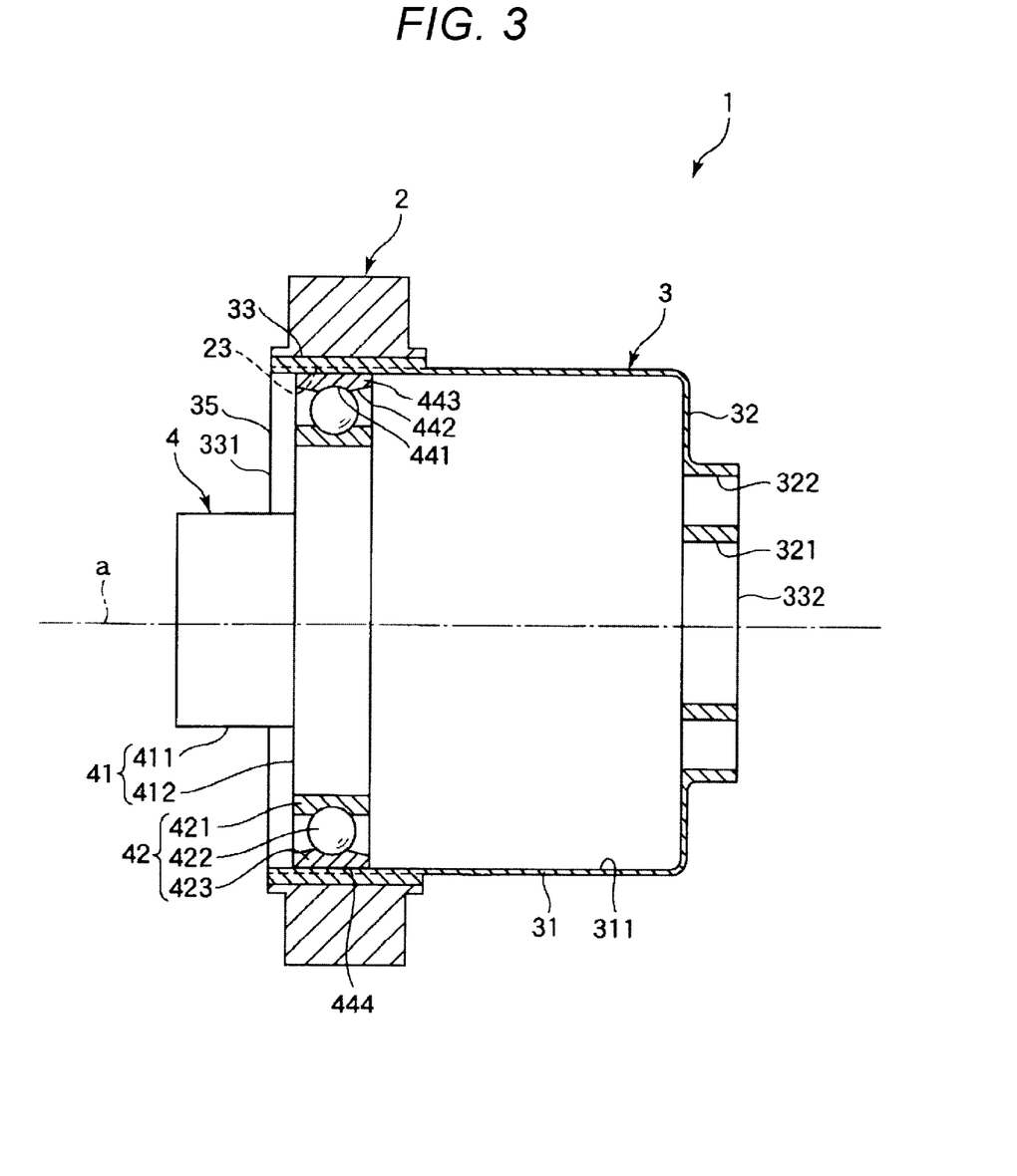
FIG. 3 is a vertical cross-sectional view of the gear device shown in FIG. 2.
Figure 4:
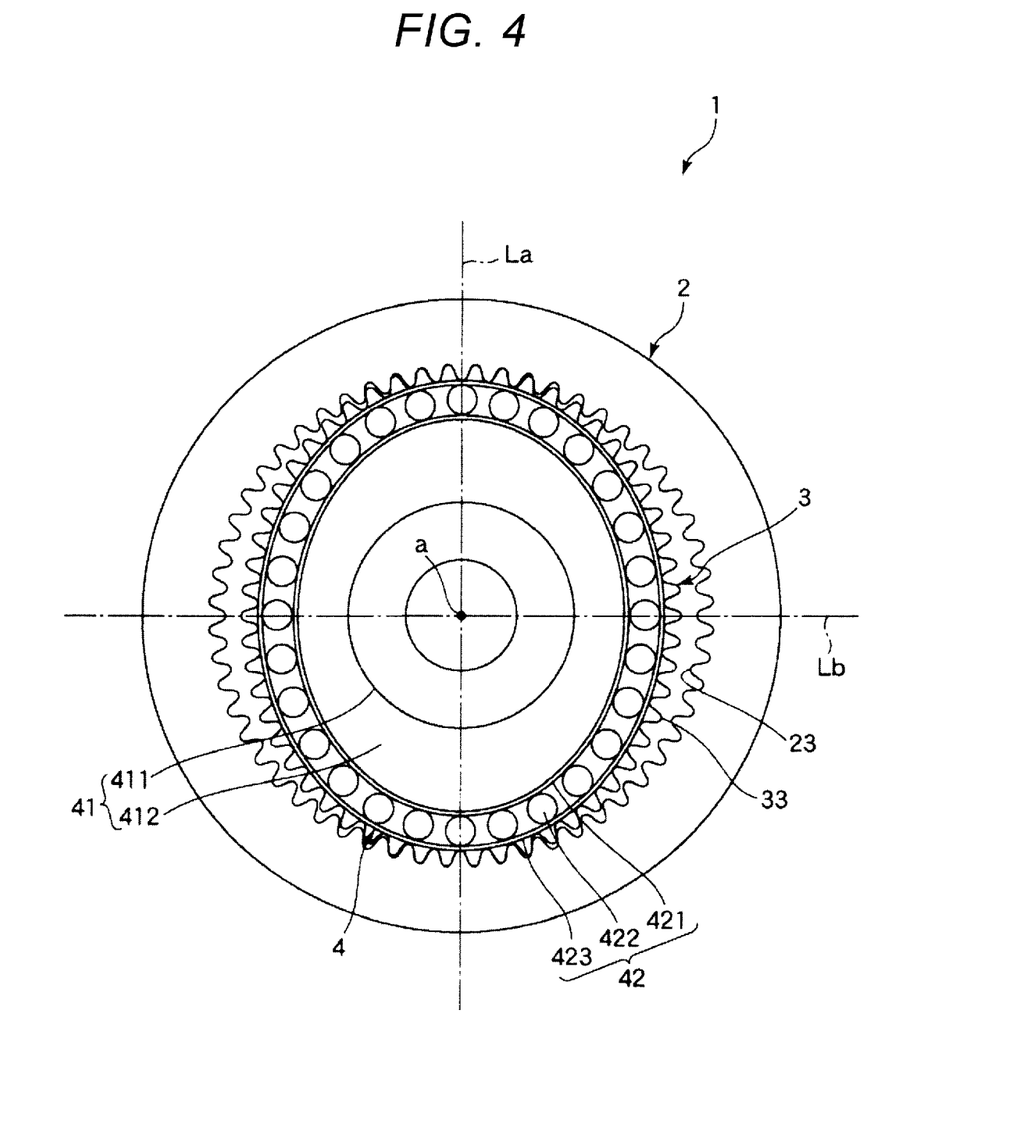
FIG. 4 is a front view of the gear device shown in FIG. 2.

FIG. 2 is an exploded perspective view showing a gear device according to an embodiment of the present disclosure. FIG. 3 is a vertical cross-sectional view of the gear device shown in FIG. 2. FIG. 4 is a front view of the gear device shown in FIG. 2. In the drawings, for the sake of convenience of the description, the dimension of each part is shown as exaggerated according to need and the dimensional ratio between parts does not coincide with the actual dimensional ratio.

The gear device 1 shown in FIGS. 2 to 4 is a wave gear device and is used, for example, as a speed reducer. The gear device 1 has a stiff internal gear 2, a flexible external gear 3 partly meshing with the internal gear 2 and rotating relative to the internal gear 2 about a rotation axis a, and a wave generator 4 being in contact with an inner circumferential surface of the external gear 3 and moving the meshing position between the internal gear 2 and the external gear 3 in a circumferential direction about the rotation axis a. Although not illustrated, a lubricant such as a grease is arranged according to need at a sliding part and a contact part inside the gear device 1. For example, a grease is applied to the inner circumferential surface of the external gear 3 and functions as a grease reservoir.

In this embodiment, the internal gear 2 is fixed to the base 111, which is the first member of the robot 100. The external gear 3 is coupled to the first arm 121, which is the second member of the robot 100. The wave generator 4 is coupled to the rotary shaft of the motor 150 of the robot 100.

As the rotary shaft of the motor 150 rotates, the wave generator 4 rotates at the same rotation speed as the motor 150. The internal gear 2 and the external gear 3 have different numbers of teeth from each other and therefore rotate relative to each other about an axial line a due to the difference in the number of teeth, with the meshing position between these gears moving in the circumferential direction. The axial line a is also referred to as the "rotation axis a".

In this embodiment, since the internal gear 2 has a greater number of teeth than the external gear 3, the external gear 3 can be rotated at a lower rotation speed than the rotation speed of the motor 150. That is, a speed reducer having the wave generator 4 on the input axis side and the external gear 3 on the output axis side can be achieved.

The forming of coupling the internal gear 2, the external gear 3, and the wave generator 4 is not limited to the foregoing form. For example, even when the external gear 3 is fixed to the base 111 and the internal gear 2 is coupled to the first arm 121, the gear device 1 can be used as a speed reducer. Also, even when the external gear 3 is coupled to the rotary shaft of the motor 150, the gear device 1 can be used as a speed reducer. In this case, the wave generator 4 may be fixed to the base 111 and the internal gear 2 may be coupled to the first arm 121. Meanwhile, to use the gear device 1 as a speed increaser, the relationship between the motor 150 side as the input side and the first arm 121 side as the output side may be reversed.

The configuration of the gear device 1 will now be described briefly. As shown in FIGS. 2 to 4, the internal gear 2 is a stiff gear that does not substantially flex in the radial direction and that has a ring-like gear having internal teeth 23. In this embodiment, the internal gear 2 is a spur gear. That is, the internal teeth 23 have a tooth trace parallel to the axial line a. The tooth trace of the internal teeth 23 may be inclined to the axial line a. That is, the internal gear 2 may be a helical gear or double-helical gear.

The external gear 3 is inserted inside the internal gear 2. The external gear 3 is a flexible gear that is flexible and deformable in the radial direction and is an external gear having external teeth 33 meshing with the internal teeth 23 of the internal gear 2. The external gear 3 has a smaller number of teeth than the internal gear 2. The difference in the number of teeth between the external gear 3 and the internal gear 2 enables the implementation of a speed reducer.

In this embodiment, the external gear 3 has a cup-like shape having an opening 35, specifically, at the left end in the direction of the axial line a in FIG. 3, and has the external teeth 33 formed on the outer circumferential surface. Here, the external gear 3 has a cylindrical trunk part 31 around the axial line a, and a bottom part 32 coupled to one end side in the direction of the axial line a of the trunk part 31, that is, at the right end in the direction of the axial line a in FIG. 3.

As shown in FIG. 3, in the bottom part 32 of the external gear 3, a hole 321 penetrating the bottom part 32 along the axial line a and a plurality of holes 322 penetrating the bottom part 32 at the periphery of the hole 321 are formed. In the hole 321, a shaft member, not illustrated, on the output side can be inserted. The holes 322 can be used as screw holes in which screws for fixing the shaft member on the output side to the bottom part 32 are inserted. These holes may be provided according to need and can be omitted.

As shown in FIGS. 3 and 4, the wave generator 4 is arranged inside the external gear 3 and is rotatable about the axial line a. The wave generator 4 deforms the cross section of the trunk part 31 of the external gear 3 into an ellipse or oval having a major axis La and a minor axis Lb and thus causes the external teeth 33 to mesh with the internal teeth 23 of the internal gear 2. In this case, the external gear 3 and the internal gear 2 mesh with each other on the inner and outer sides, respectively, in such a way as to be rotatable about the same axial line a.

The external gear 3 has two end parts 331, 332 in a direction along the axial line a. Of the two end parts 331, 332, the end part 331 on the opening 35 side is referred to as a "first end part 331", and the end part 332 opposite to the end part 331 is referred to as a "second end part 332". The first end part 331 can be said to be an end part opening in the direction along the axial line a. The trunk part 31 near the first end part 331 is a part that becomes largely deformed by coning. Coning means a three-dimensional deformation in which the trunk part 31 on the side of the major axis La shown in FIG. 4 opens outward in relation to the axial line a whereas the trunk part 31 on the minor axis Lb is narrowed inward in relation to the axial line a. The second end part 332 is an end part that becomes more deformed than the first end part 331 when the wave generator 4 is fitted in the external gear 3. The second end part 332 is an end part on the bottom part 32 side of the external gear 3.

The wave generator 4 has a cam 41 and a bearing 42 mounted at the outer circumference of the cam 41. The cam 41 has a shaft part 411 rotating about the axial line a, and a cam part 412 protruding outward from one end part of the shaft part 411. The outer circumferential surface of the cam part 412 is elliptic or oval, having the major axis La in the up-down direction in FIGS. 3 and 4, when viewed from the direction along the axial line a. The bearing 42 has an inner ring 421 and an outer ring 423 that are flexible, and a plurality of balls 422 arranged between these rings.

The inner ring 421 is fitted in the outer circumferential surface of the cam part 412 of the cam 41 and is elastically deformed into an ellipse or oval along the outer circumferential surface of the cam part 412. With this deformation, the outer ring 423, too, is elastically deformed into an ellipse or oval. An outer circumferential surface 444 of the outer ring 423 is in contact with an inner circumferential surface 311 of the trunk part 31. The outer circumferential surface of the inner ring 421 and the inner circumferential surface of the outer ring 423 are raceway surfaces 431, 441, respectively, that roll the plurality of balls 422 while guiding the balls 422 along a circumferential direction. The raceway surfaces 431, 441 have a cross section forming an arc having a slightly greater radius than the balls 422. The plurality of balls 422 are held in a holder, not illustrated, in such a way as to be kept apart from each other with a predetermined space in the circumferential direction.

In such a wave generator 4, as the cam 41 rotates about the axial line a, the direction of the cam part 412 changes and the outer ring 423 is deformed with this change. The wave generator 4 thus moves the meshing position between the internal gear 2 and the external gear 3 in the circumferential direction. At this time, the state of deformation of the inner ring 421 does not change since the inner ring 421 is mounted in a fixed manner on the outer circumferential surface of the cam part 412.

The bearing 42 is prepared according to JIS B 1521:2012. The measurement of a distance or dimension in this disclosure is carried out according to JIS B 1515-2.

Figure 5:
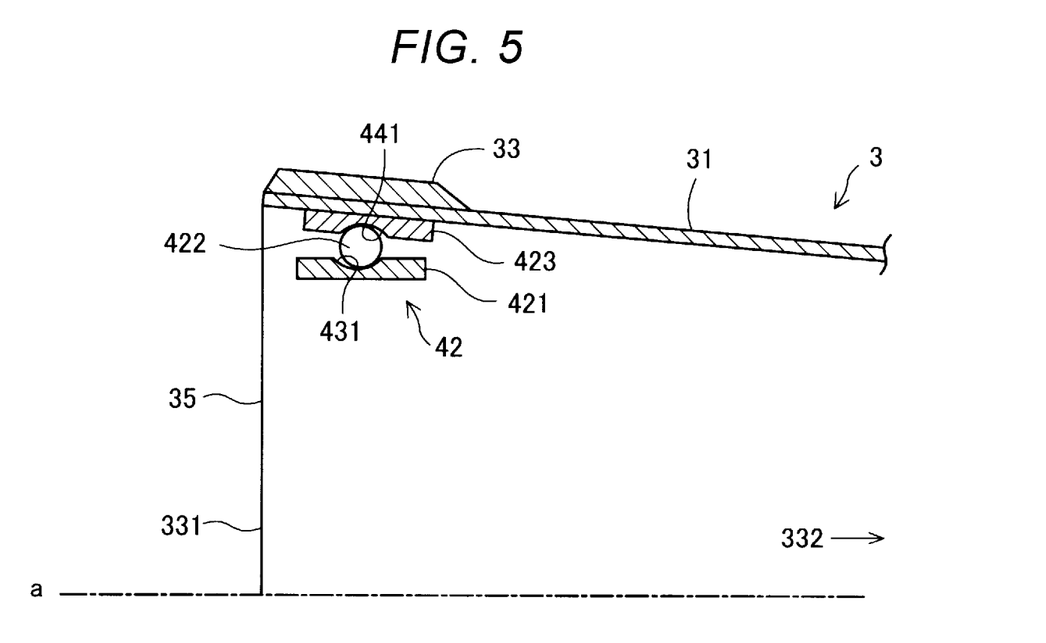
FIG. 5 is an explanatory view showing the state of the bearing on the major axis in the related-art gear device.
Figure 6:
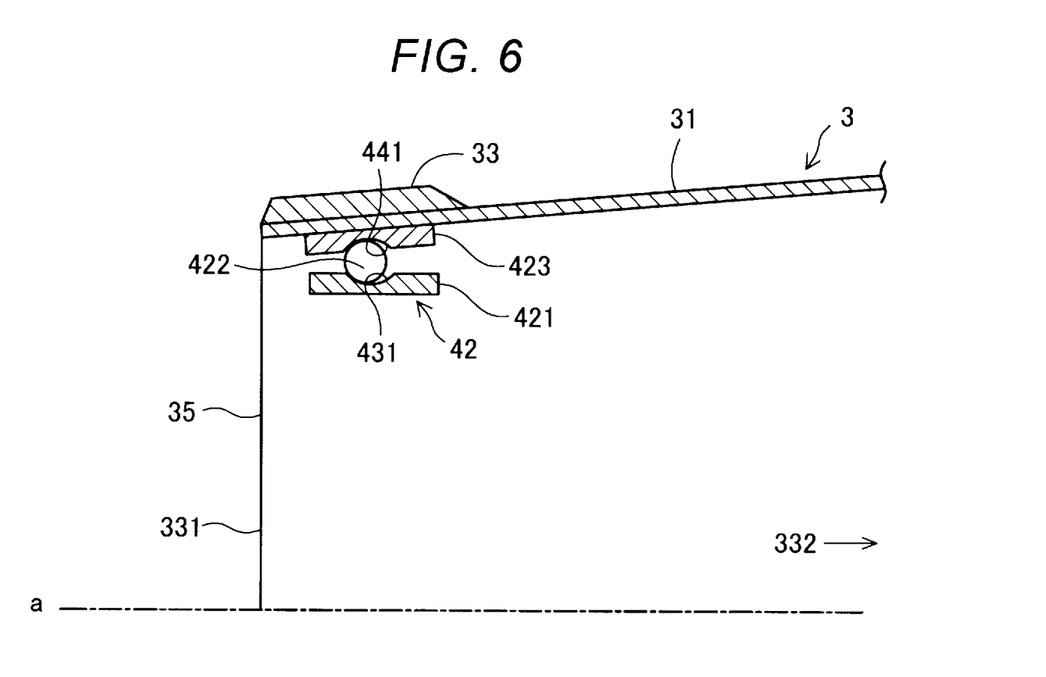
FIG. 6 is an explanatory view showing the state of the bearing on the minor axis in the related-art gear device.

FIG. 5 is an explanatory view showing the state of the bearing 42 on the major axis La in the related-art gear device. FIG. 6 is an explanatory view showing the state of the bearing 42 on the minor axis Lb in the related-art gear device. Since the wave generator 4 is elliptic, the external gear 3 is pressed outward on the major axis La side and pressed inward on the minor axis Lb side and is deformed accordingly. At this time, the outer ring 423 of the bearing 42 is deformed along the inner surface of the external gear 3. That is, the outer ring 423 of the bearing 42 is deformed in such a way as to open outward on the major axis La side and is deformed in such a way as to close inward on the minor axis Lb side. This deformation causes the outer ring 423 of the bearing 42 to move toward the second end part 332 of the external gear 3 on the major axis La side and move toward the first end part 331 of the external gear 3 on the minor axis Lb side. With such a movement of the outer ring 423, the ball 422 of the bearing 42, too, moves toward the second end part 332 on the major axis La side and moves toward the first end part 331 on the minor axis Lb side. Thus, at the position of the major axis La, the ball 422 moves to reach the edge on the second end part 332 side of the inner ring raceway surface 431 of the bearing 42, as shown in FIG. 5. Meanwhile, at the position of the minor axis Lb, the ball 422 moves to reach the edge on the first end part 331 side of the inner ring raceway surface 431 of the bearing 42, as shown in FIG. 6. When the ball 422 moves and reaches the edges of the inner ring raceway surface 431, the contact area between the ball 422 and the inner ring 421 of the bearing 42 decreases and therefore the stress between these parts increases, posing a problem in that deterioration of or damage to the inner ring raceway surface 431 and the ball 422 is more likely to occur. According to the present disclosure, the heights of the edges of the inner ring raceway surface 431 are contrived to solve such a problem.

Figure 7:
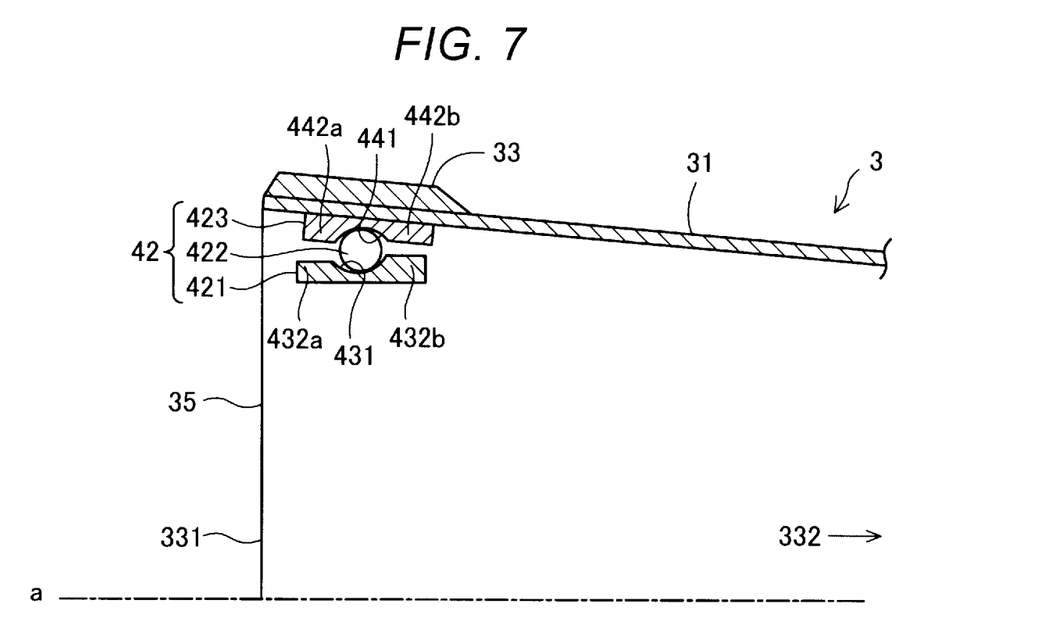
FIG. 7 is an explanatory view showing the state of a bearing on the major axis in the gear device according to the embodiment.
Figure 8:
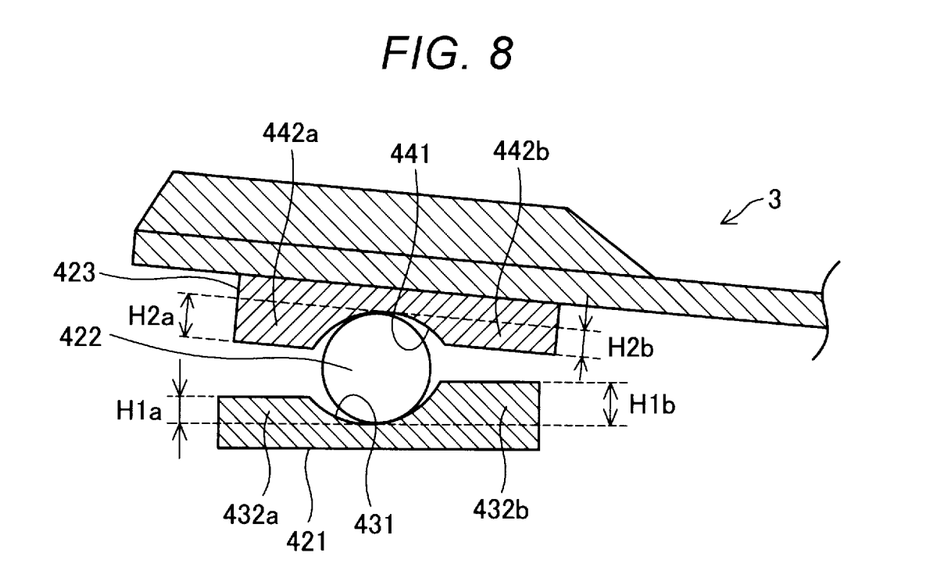
FIG. 8 is an enlarged view of the bearing shown in FIG. 7.

FIG. 7 is an explanatory view showing the state of the bearing 42 on the major axis La in the gear device 1 according to the embodiment. FIG. 8 is an enlarged view of the bearing 42 shown in FIG. 7. The inner ring 421 of the bearing 42 has an inner ring raceway surface 431 which the ball 422 is in contact with, and a pair of inner ring shoulder parts 432a, 432b being in contact with the inner ring raceway surface 431 and protruding toward the outer ring 423 as viewed in a cross section including the rotation axis a. The first inner ring shoulder part 432a is a shoulder part closer to the first end part 331 than to the second end part 332 of the external gear 3. The second inner ring shoulder part 432b is a shoulder part closer to the second end part 332 than to the first end part 331 of the external gear 3. The first inner ring shoulder part 432a has a height H1a. The second inner ring shoulder part 432b has a height H1b. The heights H1a, H1b are measured from the bottom surface of the inner ring raceway surface 431. As shown in FIGS. 7 and 8, at the position of the major axis La, the height H1b of the second inner ring shoulder part 432b is set to be greater than the height H1a of the first inner ring shoulder part 432a. Consequently, at the position of the major axis La, even when the ball 422 moves toward the second inner ring shoulder part 432b, the stress between the ball 422 and the edge of the inner ring raceway surface 431 can be restrained because the edge of the inner ring raceway surface 431 is high. Thus, the probability of deterioration of or damage to the inner ring raceway surface 431 and the ball 422 can be reduced. Also, on the major axis La side, the height H1a of the first inner ring shoulder part 432a is small, which is advantageous in that the ball 422 can be easily inserted from this part. A mark to indicate whether it is the first end part 331 side or the second end part 332 side or to indicate the position to align with the major axis may be provided on the inner ring 421. This enables accurate and efficient assembly of the wave generator 4. Alternatively, a mark to indicate whether it is the first end part 331 side or the second end part 332 side and to indicate the position to align with the major axis may be provided on the inner ring 421. The position to align with the major axis is, for example, a part where the height H1b is at its maximum, of the second inner ring shoulder part 432b.

The outer ring 423 of the bearing 42, like the inner ring 421, has an outer ring raceway surface 441 which the ball 422 is in contact with, and a pair of outer ring shoulder parts 442a, 442b being in contact with the outer ring raceway surface 441 and protruding toward the inner ring 421 as viewed in a cross section including the rotation axis a. The first outer ring shoulder part 442a is a shoulder part closer to the first end part 331 than to the second end part 332 of the external gear 3. The second outer ring shoulder part 442b is a shoulder part closer to the second end part 332 than to the first end part 331 of the external gear 3. The first outer ring shoulder part 442a has a height H2a. The second outer ring shoulder part 442b has a height H2b. The heights H2a, H2b are measured from the bottom of the outer ring raceway surface 441. In this example, the height H2a of the first outer ring shoulder part 442a is greater than the height H2b of the second outer ring shoulder part 442b both on the major axis La and on the minor axis Lb. This configuration can reduce the probability of deterioration of or damage to the outer ring raceway surface 441 and the ball 422 due to the ball 422 hitting the edges of the outer ring raceway surface 441. However, the height H2a of the first outer ring shoulder part 442a and the height H2b of the second outer ring shoulder part 442b may be set to be equal, considering the easiness of inserting the ball 422 when assembling the bearing 42.

Figure 9:
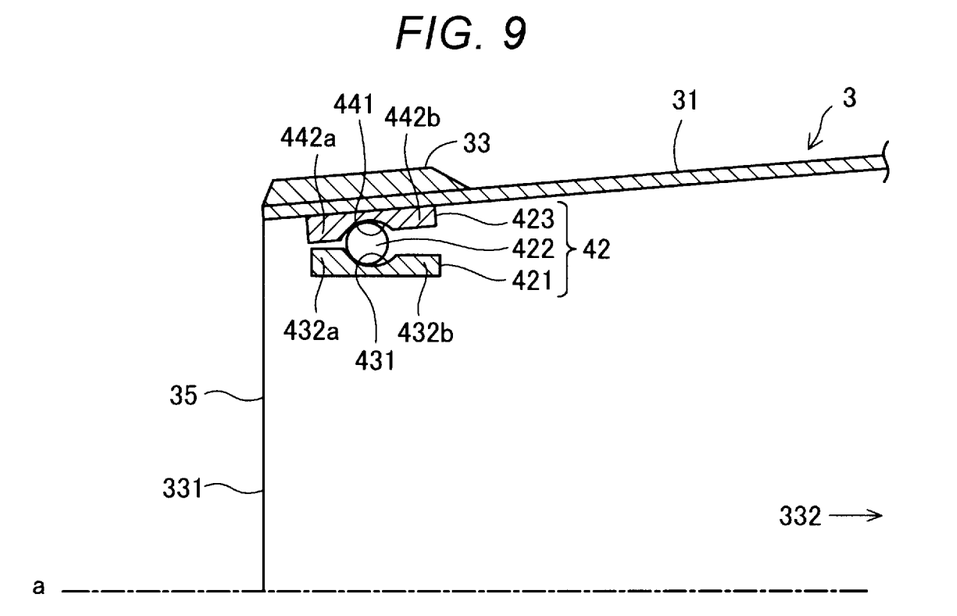
FIG. 9 is an explanatory view showing the state of the bearing on the minor axis in the same gear device in FIG. 7.
Figure 10:
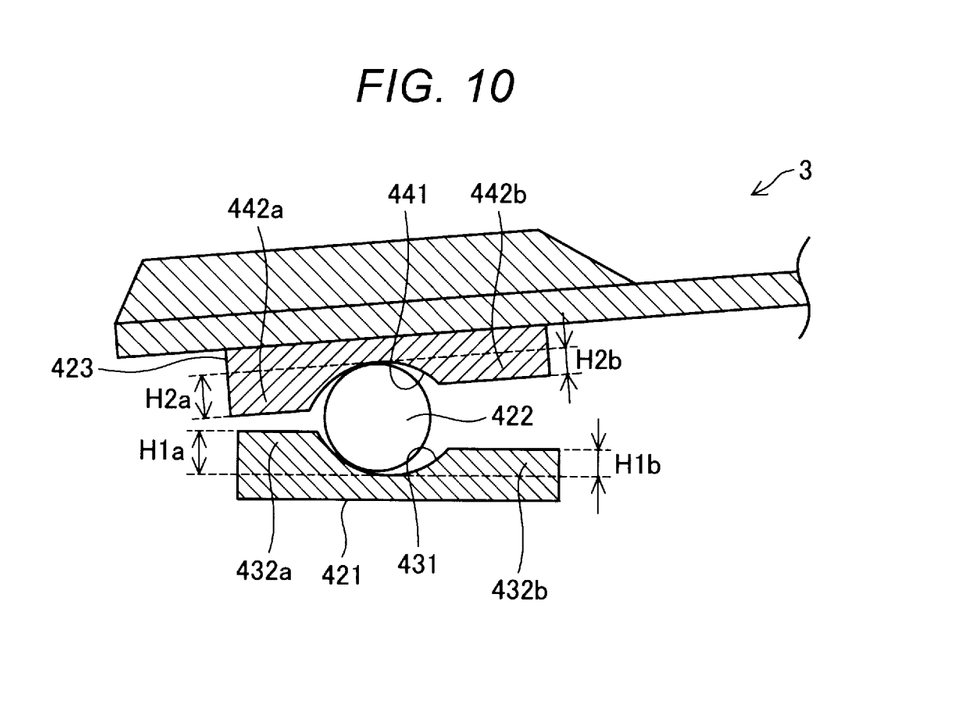
FIG. 10 is an enlarged view of the bearing shown in FIG. 9.

FIG. 9 is an explanatory view showing the state of the bearing 42 on the minor axis Lb in the gear device 1 according to the same embodiment as in FIG. 7. FIG. 10 is an enlarged view of the bearing 42 shown in FIG. 9. As shown in FIGS. 9 and 10, at the position of the minor axis Lb, the height H1a of the first inner ring shoulder part 432a is set to be greater than the height H1b of the second inner ring shoulder part 432b. Consequently, at the position of the minor axis Lb, even when the ball 422 moves toward the first inner ring shoulder part 432a, the stress between the ball 422 and the edge of the inner ring raceway surface 431 can be restrained because the edge of the inner ring raceway surface 431 is high. Thus, the probability of deterioration of or damage to the inner ring raceway surface 431 and the ball 422 can be reduced.

Figure 11:
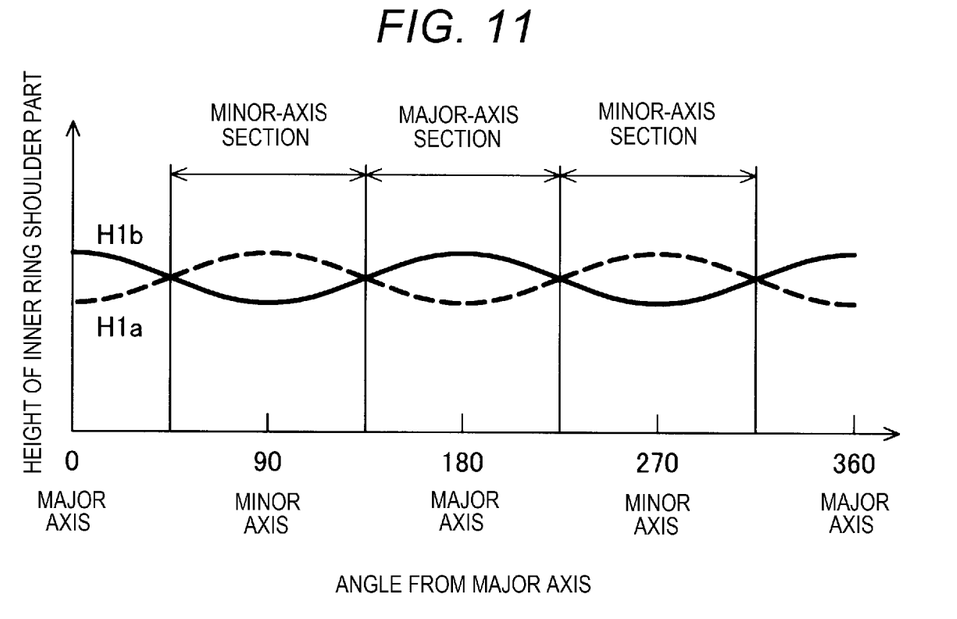
FIG. 11 is a graph showing an example of change in the height of an inner ring shoulder part over a range from the major axis to the minor axis.

FIG. 11 is a graph showing an example of change in the height H1a of the first inner ring shoulder part 432a and the height H1b of the second inner ring shoulder part 432b over a range from the major axis to the minor axis. A dashed line indicates the change in the height H1a of the first inner ring shoulder part 432a. A solid line indicates the change in the height H1b of the second inner ring shoulder part 432b. In this embodiment, as described with reference to FIGS. 7 to 10, at the position of the minor axis Lb, the height H1a of the first inner ring shoulder part 432a is greater than the height H1b of the second inner ring shoulder part 432b, and at the position of the major axis La, the height H1b of the second inner ring shoulder part 432b is greater than the height H1a of the first inner ring shoulder part 432a. In the example shown in FIG. 11, the height H1a of the first inner ring shoulder part 432a and the height H1b of the second inner ring shoulder part 432b individually and monotonically change from the position of the minor axis Lb toward the position of the major axis La. The phrase "monotonically change" means a monotonic decrease in a broad sense where the first-order differential coefficient is 0 or less, or a monotonic increase in a broad sense where the first-order differential coefficient is 0 or more. The monotonic decrease in a broad sense is also referred to as monotonic non-increase. The monotonic increase in a broad sense is also referred to as monotonic non-decrease. As the height H1a of the first inner ring shoulder part 432a and the height H1b of the second inner ring shoulder part 432b change individually and monotonically, the probability of deterioration of or damage to the inner ring raceway surface 431 and the ball 422 due to the ball 422 hitting the edges of the inner ring raceway surface 431 near the major axis La and near the minor axis Lb can be reduced further.

The depth of the inner ring raceway surface 431, that is, the height from the bottom of the concave groove of the inner ring raceway surface 431 to the edge of the inner ring raceway surface 431, is preferably, for example, 0.20 mm or greater. In other words, the minimum value of the height H1a of the first inner ring shoulder part 432a is preferably, for example, 0.20 mm or greater. The difference between the maximum value and the minimum value of the height H1a of the first inner ring shoulder part 432a is preferably set, for example, to a range of 0.10 to 0.30 mm. The height H1b of the second inner ring shoulder part 432b is similarly set. These preferable values are for the gear device 1 with a size of 1.7 inches and are changed according to the size of the gear device 1.

Also, in the example shown in FIG. 11, the outer circumference of the bearing 42 is divided into a minor-axis section including the position of the minor axis Lb and a major-axis section including the position of the major axis La. The minor-axis section is a section of ±45 degrees from the minor axis Lb. The major-axis section is a section of ±45 degrees from the major axis La. In the minor-axis section in this example, the height H1a of the first inner ring shoulder part 432a is greater than the height H1b of the second inner ring shoulder part 432b. In the major-axis section, the height H1b of the second inner ring shoulder part 432b is greater than the height H1a of the first inner ring shoulder part 432a. This configuration can further reduce the probability of deterioration of or damage to the inner ring raceway surface 431 and the ball 422 due to the ball 422 hitting the edges of the inner ring raceway surface 431.

Moreover, in the example shown in FIG. 11, the height H1a of the first inner ring shoulder part 432a at the position of the minor axis Lb and the height H1b of the second inner ring shoulder part 432b at the position of the major axis La are equal. Also, the height H1a of the first inner ring shoulder part 432a at the position of the major axis La and the height H1b of the second inner ring shoulder part 432b at the position of the minor axis Lb are equal. The configuration of these heights enables the bearing 42 to have a simple structure.

Figure 12:
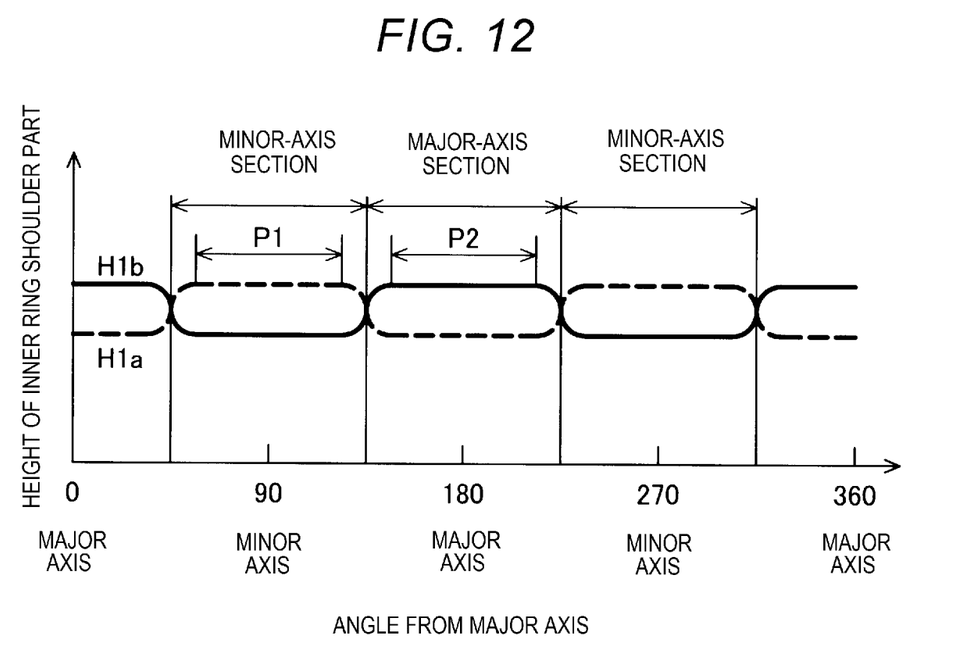
FIG. 12 is a graph showing another example of change in the height of the inner ring shoulder part over a range from the major axis to the minor axis.

FIG. 12 is a graph showing another example of change in the height of the shoulder parts of the inner ring 421 over a range from the major axis to the minor axis. In this example, as in the example shown in FIG. 11, at the position of the minor axis Lb, the height H1a of the first inner ring shoulder part 432a is greater than the height H1b of the second inner ring shoulder part 432b, and at the position of the major axis La, the height H1b of the second inner ring shoulder part 432b is greater than the height H1a of the first inner ring shoulder part 432a. Also, in this example, the height H1a of the first inner ring shoulder part 432a and the height H1b of the second inner ring shoulder part 432b are constant in a first section P1 including the position of the minor axis Lb and a second section P2 including the position of the major axis La. This configuration can further reduce the probability of deterioration of or damage to the inner ring raceway surface 431 and the ball 422 due to the ball 422 hitting the edges of the inner ring raceway surface 431. The first section P1 is preferably a range of ±30 degrees or more and ±40 degrees or less from the minor axis Lb. The second section P2 is preferably a range of ±30 degrees or more and ±40 degrees or less from the major axis La.

As described above, in the embodiment, at the position of the minor axis Lb, the height H1a of the first inner ring shoulder part 432a is greater than the height H1b of the second inner ring shoulder part 432b, and at the position of the major axis La, the height H1b of the second inner ring shoulder part 432b is greater than the height H1a of the first inner ring shoulder part 432a. Consequently, in the inner ring 421, the first inner ring shoulder part 432a can support the ball 422 at the position of the minor axis Lb and the second inner ring shoulder part 432b can support the ball 422 at the position of the major axis La. Therefore, the probability of deterioration of or damage to the inner ring raceway surface 431 and the ball 422 due to the ball 422 hitting the edges of the inner ring raceway surface 431 can be reduced.

In the embodiment, the cup-shaped external gear 3 is used. However, a hat-shaped external gear may be used instead. The hat-shaped external gear has a flange part instead of the bottom part 32. The flange part is provided on the second end part 332 side in the direction of the rotation axis a and protrudes in a direction away from the rotation axis a. A gear device having the hat-shape external gear can employ the configurations described with reference to FIGS. 5 to 12 and thus can achieve effects similar to the above.

The present disclosure is not limited to the foregoing embodiment and can be implemented in various aspects without departing from the spirit and scope of the present disclosure. For example, the present disclosure can be implemented in the aspects described below. A technical feature in the embodiment corresponding to a technical feature in each of the aspects described below can be suitably replaced or combined with another technical feature in order to solve a part or all of the problems of the present disclosure or in order to achieve a part or all of the effects of the present disclosure. The technical feature can be suitably deleted unless described as essential in this specification.

(1) According to a first aspect of the present disclosure, a gear device is provided. This gear device includes: an internal gear; a flexible external gear partly meshing with the internal gear and rotating relative to the internal gear about a rotation axis; and a wave generator being in contact with an inner circumferential surface of the external gear and moving a meshing position between the internal gear and the external gear in a circumferential direction about the rotation axis. The wave generator has a cam having an elliptic outer circumferential surface having a major axis and a minor axis, and a bearing arranged between the inner circumferential surface of the external gear and the outer circumferential surface of the cam. The bearing has an inner ring, an outer ring, and a plurality of balls arranged between the inner ring and the outer ring. The inner ring has an inner ring raceway surface which the plurality of balls are in contact with, and a pair of inner ring shoulder parts adjacent to the inner ring raceway surface and protruding toward the outer ring as viewed in a cross section including the rotation axis. The external gear, laid along the rotation axis, has an open first end part and a second end part opposite to the first end part. The wave generator is fitted in the inner circumferential surface of the external gear at a position closer to the first end part than to the second end part of the external gear. The pair of inner ring shoulder parts include a first inner ring shoulder part closer to the first end part than to the second end part, and a second inner ring shoulder part closer to the second end part than to the first end part. At a position of the minor axis, the first inner ring shoulder part has a greater height than the second inner ring shoulder part. At a position of the major axis, the second inner ring shoulder part has a greater height than the first inner ring shoulder part.

In this gear device, in the inner ring, the first inner ring shoulder part can support the ball at the position of the minor axis, and the second inner ring shoulder part can support the ball at the position of the major axis. Therefore, the probability of deterioration of or damage to the inner ring raceway surface and the ball due to the ball hitting the edges of the inner ring raceway surface can be reduced.

(2) In the gear device, the height of the first inner ring shoulder part and the height of the second inner ring shoulder part may change individually and monotonically from the position of the minor axis toward the position of the major axis.

In this gear device, the height of the first inner ring shoulder part and the height of the second inner ring shoulder part change individually and monotonically. Therefore, the probability of deterioration of or damage to the inner ring raceway surface and the ball due to the ball hitting the edges of the inner ring raceway surface near the major axis or near the minor axis can be reduced further.

(3) In the gear device, the height of the first inner ring shoulder part and the height of the second inner ring shoulder part may be constant in a first section including the position of the minor axis and a second section including the position of the major axis.

In this gear device, the probability of deterioration of or damage to the inner ring raceway surface and the ball due to the ball hitting the edges of the inner ring raceway surface can be reduced further.

(4) In the gear device, the height of the first inner ring shoulder part at the position of the minor axis and the height of the second inner ring shoulder part at the position of the major axis may be equal.

In this gear device, the configuration of the bearing can be simplified.

(5) In the gear device, the height of the first inner ring shoulder part at the position of the major axis and the height of the second inner ring shoulder part at the position of the minor axis may be equal.

In this gear device, the configuration of the bearing can be simplified.

(6) In the gear device, the outer ring may have an outer ring raceway surface which the plurality of balls are in contact with, and a pair of outer ring shoulder parts adjacent to the outer ring raceway surface and protruding toward the inner ring as viewed in a cross section including the rotation axis. The pair of outer ring shoulder parts may include a first outer ring shoulder part closer to the first end part than to the second end part, and a second outer ring shoulder part closer to the second end part than to the first end part. The first outer ring shoulder part may have a greater height than the second outer ring shoulder part.

In this gear device, the probability of deterioration of or damage to the outer ring raceway surface and the ball due to the ball hitting the edges of the outer ring raceway surface can be reduced further.

(7) According to a second aspect of the present disclosure, a robot is provided. This robot includes: a first member forming a base or an arm; a second member forming an arm provided in such a way as to be able to swivel in relation to the first member; and a gear device transmitting a drive force from one of the first member and the second member toward the other. The gear device has an internal gear, a flexible external gear partly meshing with the internal gear and rotating relative to the internal gear about a rotation axis, and a wave generator being in contact with an inner circumferential surface of the external gear and moving a meshing position between the internal gear and the external gear in a circumferential direction about the rotation axis. The wave generator has a cam having an elliptic outer circumferential surface having a major axis and a minor axis, and a bearing arranged between the inner circumferential surface of the external gear and the outer circumferential surface of the cam. The bearing has an inner ring, an outer ring, and a plurality of balls arranged between the inner ring and the outer ring. The inner ring has an inner ring raceway surface which the plurality of balls are in contact with, and a pair of inner ring shoulder parts adjacent to the inner ring raceway surface and protruding toward the outer ring as viewed in a cross section including the rotation axis. The external gear, laid along the rotation axis, has an open first end part and a second end part opposite to the first end part. The wave generator is fitted in the inner circumferential surface of the external gear at a position closer to the first end part than to the second end part of the external gear. The pair of inner ring shoulder parts include a first inner ring shoulder part closer to the first end part than to the second end part, and a second inner ring shoulder part closer to the second end part than to the first end part. At a position of the minor axis, the first inner ring shoulder part has a greater height than the second inner ring shoulder part. At a position of the major axis, the second inner ring shoulder part has a greater height than the first inner ring shoulder part.

In this robot, in the inner ring, the first inner ring shoulder part can support the ball at the position of the minor axis, and the second inner ring shoulder part can support the ball at the position of the major axis. Therefore, the probability of deterioration of or damage to the inner ring raceway surface and the ball due to the ball hitting the edges of the inner ring raceway surface can be reduced.

What is claimed is:

1. A gear device comprising:
   an internal gear;
   a flexible external gear partly meshing with the internal gear and rotating relative to the internal gear about a rotation axis; and
   a wave generator being in contact with an inner circumferential surface of the external gear and moving a meshing position between the internal gear and the external gear in a circumferential direction about the rotation axis, wherein
   the wave generator has a cam having an elliptic outer circumferential surface having a major axis and a minor axis, and a bearing arranged between the inner circumferential surface of the external gear and the outer circumferential surface of the cam,
   the bearing has an inner ring, an outer ring, and a plurality of balls arranged between the inner ring and the outer ring,
   the inner ring has an inner ring raceway surface which the plurality of balls are in contact with, and a pair of inner ring shoulder parts adjacent to the inner ring raceway surface and protruding toward the outer ring as viewed in a cross section including the rotation axis,
   the external gear has a first end part opening in a direction along the rotation axis, and a second end part opposite to the first end part,
   the wave generator is fitted in the inner circumferential surface of the external gear at a position closer to the first end part than to the second end part of the external gear,
   the pair of inner ring shoulder parts include a first inner ring shoulder part closer to the first end part than to the second end part, and a second inner ring shoulder part closer to the second end part than to the first end part, and
   at a position of the minor axis, the first inner ring shoulder part has a greater height than the second inner ring shoulder part, and at a position of the major axis, the second inner ring shoulder part has a greater height than the first inner ring shoulder part.

2. The gear device according to claim 1, wherein the height of the first inner ring shoulder part and the height of the second inner ring shoulder part change individually and monotonically from the position of the minor axis toward the position of the major axis.

3. The gear device according to claim 1, wherein the height of the first inner ring shoulder part and the height of the second inner ring shoulder part are constant in a first section including the position of the minor axis and a second section including the position of the major axis.

4. The gear device according to claim 1, wherein the height of the first inner ring shoulder part at the position of the minor axis and the height of the second inner ring shoulder part at the position of the major axis are equal.

5. The gear device according to claim 1, wherein the height of the first inner ring shoulder part at the position of the major axis and the height of the second inner ring shoulder part at the position of the minor axis are equal.

6. The gear device according to claim 1, wherein the outer ring has an outer ring raceway surface which the plurality of balls are in contact with, and a pair of outer ring shoulder parts adjacent to the outer ring raceway surface and protruding toward the inner ring as viewed in a cross section including the rotation axis, the pair of outer ring shoulder parts include a first outer ring shoulder part closer to the first end part than to the second end part, and a second outer ring shoulder part closer to the second end part than to the first end part, and the first outer ring shoulder part has a greater height than the second outer ring shoulder part.

7. A robot comprising:

a first member forming a base or an arm;

a second member forming an arm provided in such a way as to be able to swivel in relation to the first member; and a gear device transmitting a drive force from one of the first member and the second member toward the other, wherein the gear device has an internal gear, a flexible external gear partly meshing with the internal gear and rotating relative to the internal gear about a rotation axis, and a wave generator being in contact with an inner circumferential surface of the external gear and moving a meshing position between the internal gear and the external gear in a circumferential direction about the rotation axis, the wave generator has a cam having an elliptic outer circumferential surface having a major axis and a minor axis, and a bearing arranged between the inner circumferential surface of the external gear and the outer circumferential surface of the cam, the bearing has an inner ring, an outer ring, and a plurality of balls arranged between the inner ring and the outer ring, the inner ring has an inner ring raceway surface which the plurality of balls are in contact with, and a pair of inner ring shoulder parts adjacent to the inner ring raceway surface and protruding toward the outer ring as viewed in a cross section including the rotation axis, the external gear has a first end part opening in a direction along the rotation axis, and a second end part opposite to the first end part, the wave generator is fitted in the inner circumferential surface of the external gear at a position closer to the first end part than to the second end part of the external gear, the pair of inner ring shoulder parts include a first inner ring shoulder part closer to the first end part than to the second end part, and a second inner ring shoulder part closer to the second end part than to the first end part, and at a position of the minor axis, the first inner ring shoulder part has a greater height than the second inner ring shoulder part, and at a position of the major axis, the second inner ring shoulder part has a greater height than the first inner ring shoulder part.

* * * * *